UNITED STATES PATENT OFFICE.

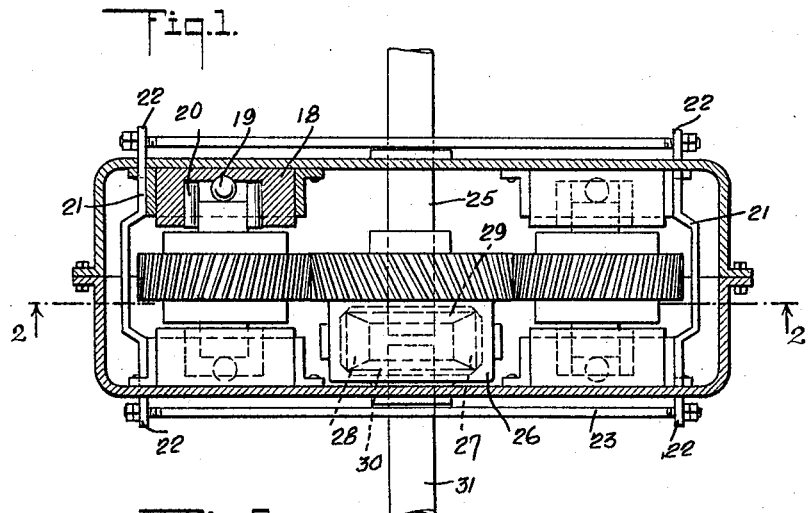
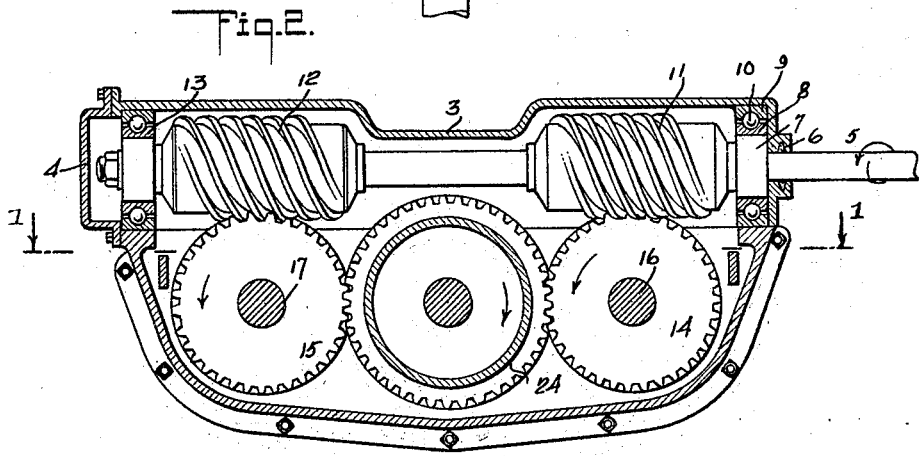
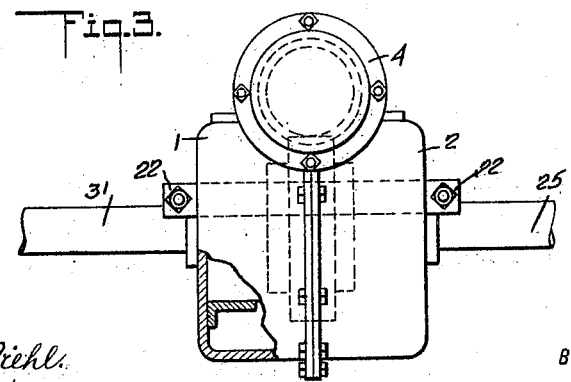

PAUL V. TROUPE, OF MOLINE, ILLINOIS.

DIFFERENTIAL TRANSMISSION GEARING.

1,405,359.  Specification of Letters Patent.  Patented Jan. 31, 1922.

Application filed August 2, 1921. Serial No. 489,221.

*To all whom it may concern:*

Be it known that I, PAUL V. TROUPE, a citizen of the United States, and a resident of Moline, in the county of Rock Island and State of Illinois, have invented a new and Improved Differential Transmission Gearing, of which the following is a full, clear, and exact description.

This invention relates to a differential gear unit, and has for an object the provision of a differential unit in which the stresses and strains due to the transmission of power therethrough are uniformly and symmetrically balanced so that the wear on the unit is substantially reduced and the life of the unit correspondingly increased.

Another object is to provide a simple, economically manufactured unit in which power is most efficiently transferred, so that a greater percentage of the engine power is available for driving the vehicle to which this unit is attached.

A further object resides in the particular construction and arrangement of parts which are hereinafter described and claimed and shown in the accompanying drawings.

The invention is illustrated in the drawings, of which—

Figure 1 is a horizontal section taken on the line 1—1 of Figure 2;

Figure 2 is a vertical section taken on the line 2—2 of Figure 1; and

Figure 3 is an end elevation of the unit.

The preferred embodiment of my invention, as illustrated in the drawings, comprises a differential power transmitting unit enclosed within a casing. This casing comprises a pair of lower sections 1 and 2 separated along vertical lines and adapted to be fastened together in any suitable manner, and a cover portion 3 which may be fastened to the sections 1 and 2, as desired. One end of the cover portion, which is somewhat cylindrical in shape, is provided with a cap, such as 4, whereby the apparatus or operating parts disposed within the cover portion can be removed merely by removing this cap.

A power-transmitting shaft 5 extends through a suitable bearing 6 at one end of the cover portion 3 and is provided with a hub 7 to which is attached one member 8 of a roller ball race, the other member 9 of which is mounted within the casing. Ball bearings 10 are disposed in the usual manner between these members 8 and 9. Worm gears 11 and 12 are disposed on the shaft 5 within the casing, particularly beneath the cover 3 and in line with the cap 4, so that the shaft and the worm gears may be readily removed merely by removing the cap 4. Another ball bearing race unit, such as 13, and similar to the one previously described, is mounted at the opposite end of shaft 5 within the cover 3.

These worm gears are respectively adapted to engage with spur gears 14 and 15 mounted on stub shafts 16 and 17. These stub shafts are preferably journaled in boxes, of which 18 is an example, all these boxes being similar. Each of these boxes is bolted or otherwise fastened to the walls of the casing. A ball bearing 19 is disposed at each end of each stub shaft, and roller bearings, such as 20, surround the ends of the stub shafts at the sides thereof and between the shaft and the side walls of the boxes. In this manner the rotation of the stub shaft is permitted with a minimum amount of friction loss. There are four journal boxes 18 arranged in pairs. A tie strap, such as 21, extends across between similar outer faces of pairs of these boxes and extends, as shown at 22, at its opposite ends outside the casing. Uprights, such as 23, connect corresponding ends of these straps and can be adjusted to the proper degree of tension. These tie straps and tie rods are arranged for the purpose of absorbing any thrusts on the stub shaft, due to the transmission of power, which would tend to separate the boxes 18.

The spur gears 14 and 15 are adapted respectively to engage or mesh at opposite sides of a ring gear, such as 24. This ring gear is loosely mounted on one end of an axle or shaft 25. On one side of this ring gear there is attached a differential casing 26. This casing contains two small bevel pinions 27 and 28 which are rotatably fastened to the differential casing 26. Each of these pinions mesh with a bevel gear 29 on the end of axle 25, and with a bevel gear 30 on the end of another axle 31 separated from but alined with the axle 25. The outer ends of the axles 25 and 31 may be connected with any suitable devices, such as wheels, although this structure is not shown.

In the operation of the device, the rotation of the shaft 5 will move the worm gears 11 and 12 in the same direction and will, consequently, turn the spur gears 14 and 15 in the same direction. This will cause the ring gear 24 to move in the opposite direction to the movement of gears 14 and 15.

This movement of the ring gear 24 will cause the rotation of the differential casing 26, and this, due to the differential bevel gears above described, will permit of the movement of axles 25 and 31 in any manner independent of each other. The engagement of spur gears 14 and 15 on the opposite sides of ring gear 24 causes the thrusts on this ring gear to be balanced. The particular bearings provided at the end of each of the stub shafts result in a minimum of friction being produced. The adjustable connection between the journal boxes prevents any distortion of these boxes and absorbs any tendency for outward thrusts therebetween due to the transmission of heavy loads.

What I claim is:

1. A differential gearing unit which comprises a driving shaft, a pair of worm gears thereon, a pair of spur gears meshing respectively with the worm gears, and a ring gear meshing at opposite sides thereof with the spur gears.

2. A differential gearing unit which comprises a driving shaft, a pair of worm gears thereon, a pair of spur gears meshing respectively with the worm gears, a ring gear meshing at opposite sides thereof with the spur gears, and a differential unit connected to said ring gear.

3. A gear unit which comprises a casing, a plurality of gears therein, a plurality of journal boxes, a plurality of shafts connected to said gears and journaled in said boxes, tie straps connecting said boxes in sets, and tie rods connecting the straps whereby the relative position of sets of said boxes can be definitely determined against undue thrusts due to transmission of power.

4. A differential gear unit which comprises a driving shaft, a ring gear, spur gears meshing with said ring gear at opposite sides thereof, a pair of worm gears mounted on said shaft and meshing with said spur gears, a differential casing connected to the ring gear, a pair of axles separately spaced and independently operated, and a differential gearing within said differential casing adapted to transmit power between the ring gear and the axles.

5. A gear unit comprising a casing, a plurality of pairs of journal boxes mounted in said casing, gears within said casing, shafts on which said gears are mounted, the ends of said shafts bearing in said boxes, a tie strap extending across between a pair of said boxes, a second tie strap extending across between a second pair of said boxes, the ends of said tie straps extending without the casing, tie rods connecting the corresponding ends of said straps, and means for tightening said tie rods whereby the pressure between the straps can be increased to hold the boxes in a definite relative position against the tendency to be separated due to the transmission of power.

6. A differential gear unit device which comprises a driving shaft, a pair of worm gears thereon, a pair of spur gears meshing respectively with the worm gears, a ring gear meshing at opposite sides with the respective spur gears, an axle on the end of which said ring gear is loosely mounted, a bevel gear on the end of said axle, a second axle separate from but in alignment with the first axle, a bevel gear on the end of said second axle, a casing attached to one side of the ring gear and enclosing said bevel gears, and bevel pinions connected to the casing and meshing with both of the bevel gears whereby the movement of the ring gear will result in a differential action between the two axles.

PAUL V. TROUPE.